(12) United States Patent
Verschuren

(10) Patent No.: US 7,352,659 B2
(45) Date of Patent: Apr. 1, 2008

(54) METHOD AND APPARATUS FOR PHASE AND/OR COPY WINDOW CONTROL USE WITH A DOMAIN EXPANSION RECORDING MEDIUM AND RECORD CARRIER

(75) Inventor: Coen Adrianus Verschuren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 451 days.

(21) Appl. No.: 10/504,134

(22) PCT Filed: Jan. 24, 2003

(86) PCT No.: PCT/IB03/00204

§ 371 (c)(1),
(2), (4) Date: Aug. 10, 2004

(87) PCT Pub. No.: WO03/069615

PCT Pub. Date: Aug. 21, 2003

(65) Prior Publication Data

US 2005/0162986 A1    Jul. 28, 2005

(30) Foreign Application Priority Data

Feb. 14, 2002    (EP)    ................................. 02075600

(51) Int. Cl.
*G11B 11/00*    (2006.01)
(52) U.S. Cl. ................................. 369/13.08; 369/13.06; 369/13.02; 369/13.14

(58) Field of Classification Search ..................... None
See application file for complete search history.

(56) References Cited

U.S. PATENT DOCUMENTS

| 5,060,208 | A  | * | 10/1991 | Nagai et al. ............. | 369/13.27 |
| 6,192,008 | B1 | * | 2/2001  | Kim ......................... | 369/13.02 |
| 6,249,490 | B1 | * | 6/2001  | Miyaoka .................. | 369/13.14 |
| 6,477,118 | B1 | * | 11/2002 | Awano et al. ............ | 369/13.14 |
| 6,567,348 | B1 | * | 5/2003  | Wakabayashi et al. ... | 369/13.54 |
| 6,687,194 | B1 | * | 2/2004  | Kobayashi et al. ...... | 369/13.05 |
| 6,809,994 | B2 | * | 10/2004 | Verschuren .............. | 369/13.26 |

FOREIGN PATENT DOCUMENTS

JP          A260079          9/2000

* cited by examiner

*Primary Examiner*—William Korzuch
*Assistant Examiner*—Tawfik Goma
(74) *Attorney, Agent, or Firm*—Michael E. Belk

(57) ABSTRACT

A method and apparatus for controlling read-out and/or synchronization between an external magnetic field and written data during a reading operation from a magneto-optical recording medium includes generating a pulse in a reading signal in a read-out layer by copying a mark region from a storage layer to the read-out layer upon heating by a radiation power and with the aid of the external magnetic field. The waveform of the reading signal is analyzed, and the analysis result is used for correcting a phase deviation and/or for controlling a copy window size of the mark copying. Phase errors may thus be corrected for any size of the copy window. Even small changes in the copy window can be detected and corrected.

19 Claims, 7 Drawing Sheets w = 0 * b/8 w = 2 * b/8

|     | 0 | b/4 | b/2 | 3b/4 | b | 10b/8 | 12b/8 | 14b/8 | 2b |
|-----|---|-----|-----|------|---|-------|-------|-------|-----|
| -180 |   | b<<<s | b<<s | b<s | b=s | b=s | b=s | b=s | b=s |
| -135 | b<<<s | b<<s | b<s | b=s | b=s | b=s | b=s | b=s | b<<<s |
| -90 | b<<<s | b<s | b=s | b=s | b=s | b=s | b=s | b<<<s | b<<<s |
| -45 | b<s | b=s | b=s | b=s | b=s | b<<<s | b<<<s | b<s | |
| 0 | b=s | b=s | b=s | b=s | b<<<s | b<<<s | b<s | b=s | |
| 45 | b=s | b=s | b=s | b=s | b<<<s | b<<s | b=s | b=s | |
| 90 | b=s | b=s | b=s | b<<<s | b<<s | b<s | b=s | b=s | b=s |
| 135 | b=s | b=s | b<<<s | b<<s | b<s | b=s | b=s | b=s | b=s |
| 180 |   | b<<<s | b<<s | b<s | b=s | b=s | b=s | b=s | b=s |

|     | 0 | b/4 | b/2 | 3b/4 | b | 10b/8 | 12b/8 | 14b/8 | 2b |
|-----|---|-----|-----|------|---|-------|-------|-------|-----|
| 0   | b=s | b=s | b=s | b=s | b=s | b<<s | b<<s | b<s | b=s |
| 45  | b=s | b=s | b=s | b=s | b<<s | b<<s | b<s | b=s | b=s |
| 90  | b=s | b=s | b=s | b<<s | b<<s | b<s | b=s | b=s | b=s |
| 135 | b=s | b=s | b<<<s | b<<s | b<s | b=s | b=s | b=s | b=s |
| 180 | b=s | b<<<s | b<<s | b<s | b=s | b=s | b=s | b=s | b=s |
| 225 | b<<<s | b<<s | b<s | b=s | b=s | b=s | b=s | b=s | b<<<s |
| 270 | b<<s | b<s | b=s | b=s | b=s | b=s | b=s | b<<s | b<<s |
| 315 | b<s | b=s | b=s | b=s | b=s | b=s | b<<s | b<<s | b<s |
| 360 | b=s | b=s | b=s | b=s | b=s | b<<s | b<s | b<s | b=s |

METHOD AND APPARATUS FOR PHASE AND/OR COPY WINDOW CONTROL USE WITH A DOMAIN EXPANSION RECORDING MEDIUM AND RECORD CARRIER

The present invention relates to a method, apparatus and record carrier for controlling read-out from a magneto-optical recording medium and/or for controlling the phase between an external magnetic field and data written to the magneto-optical recording medium, such as a MAMMOS (Magnetic AMplifying Magneto-Optical System) disk, comprising a recording or storage layer and an expansion or read-out layer.

In magneto-optical storage systems, the minimum width of the recorded marks is determined by the diffraction limit, i.e. by the Numerical Aperture (NA) of the focussing lens and the laser wavelength. A reduction of the width is generally based on shorter wavelength lasers and higher NA focussing optics. During magneto-optical recording, the minimum bit length can be reduced to below the optical diffraction limit by using Laser Pulsed Magnetic Field Modulation (LP-MFM). In LP-MFM, the bit transitions are determined by the switching of the field and the temperature gradient induced by the switching of the laser. For read-out of the small crescent-shaped marks recorded in this way, Magnetic Super Resolution (MSR) or Domain Expansion (DomEx) methods have been proposed. These technologies are based on recording media with several magneto-static or exchange-coupled RE-TM layers. According to MSR, a read-out layer on a magneto-optical disk is arranged to mask adjacent bits during reading, while, according to domain expansion, a domain in the center of a spot is expanded. The advantage of the domain expansion technique over MSR results in that bits with a length below the diffraction limit can be detected with a similar signal-to-noise ratio (SNR) as bits with a size comparable to the diffraction limited spot. MAMMOS is a domain expansion method based on magneto-statically coupled storage and read-out layers, wherein a magnetic field modulation is used for expansion and collapse of expanded domains in the read-out layer.

In the above-mentioned domain expansion techniques, like MAMMOS, a written mark from the storage layer is copied to the read-out layer upon laser heating with the aid of an external magnetic field. Due to the low coercivity of this read-out layer, the copied mark will expand to fill the optical spot and can be detected with a saturated signal level which is independent of the mark size. Reversal of the external magnetic field collapses the expanded domain. A space in the storage layer, on the other hand, will not be copied and no expansion occurs. Therefore, no signal will be detected in this case.

During MAMMOS read-out, synchronization between the data and the external magnetic field (and the laser power in case of a pulsed strategy) is required. The reason for this requirement is that a small phase error already introduces a false peak when the copy window is close to its maximum size for correct read-out. For this purpose timing fields and/or a wobble in the track can be used. In this way, quite reasonable frequency control is possible, but phase errors are very difficult to avoid. However, for MAMMOS no phase control method has been proposed yet.

Furthermore, the laser power used in the read-out process should be high enough to enable copying. On the other hand, a higher laser power also increases the overlap of the temperature-induced coercivity profile and the stray field profile of the bit pattern. The coercivity $H_c$ decreases and the stray field increases with increasing temperature. When this overlap becomes too large, correct read-out of a space is no longer possible due to false signals generated by neighboring marks. The difference between this maximum and the minimum laser power determines the power margin, which decreases strongly with decreasing bit length. Experiments have shown that with the current methods, bit lengths of 0.10 µm can be correctly detected, but at a power margin of virtually nothing (1 bit of a 16 bit DAC). Therefore, a method has been proposed to use the occurrence and number of false read-out signals to measure the copy window. This measurement can be used to correct the read data and to correct the size of the copy window (e.g. by changing the laser power). However, according to this known method, a correction of the copy window size is only possible when the window size changes sufficiently to generate false peaks, so that an averaging method is required to refine the control.

It is an object of the present invention to provide a method, apparatus and record carrier for providing a copy window and/or phase control for a domain expansion read-out process.

Accordingly, any deviation in the window size or the phase, which has an influence on the waveform of the reading signal, can be readily detected by analyzing the waveform of the reading signal. Thereby, a fine-tuning feature can be provided, where an error correction is already possible before at least partially uncorrectable errors occur in the reading signal. Moreover, much less averaging is required, so that even very small non-uniformities or brief fluctuations in the magnetic field or laser power can be dealt with.

The correction step for correcting the phase deviation or error may be performed by shifting the timing of the external magnetic field. Furthermore, the phase correction step may be based on predetermined correction rules which depend on a write strategy and/or a read strategy used. Thus, quite simple rules can be defined for many combinations of write and read strategies. In particular, the correction rules may define a correction amount and direction. A correction rule which may define e.g. an amount and a direction of the phase correction can then be derived directly from a detected amount of change in the waveform of the reading signal.

According to an advantageous further development, correction rules may be defined for an additional copy window correction. Such a combination of the phase control with an additional or simultaneous copy window control yields an even better control. The copy window size controlling step may be performed by controlling the radiation power and/or the strength of the external magnetic field.

According to another advantageous further development, synchronization phase errors detected between the external magnetic field and the written data may be used in the analyzing step. When phase errors in the synchronization and the size of the copy window are both included in the analysis, phase errors up to 180° can be detected and corrected for any size value of the copy window.

The analyzing step may be applied either to a reading signal obtained by reading a test area provided on the recording medium or to a reading signal obtained by reading written user data.

Preferably, the analyzing step may comprise comparing the timing of the rising edge and/or the duration of a predetermined pulse of the reading signal with a reference value. Thus, any deviation in the synchronization phase or copy window size can be detected simply on the basis of changes in the reading pulses. The predetermined pulse may be the first pulse of a code run-length. The duration may be determined by detecting the pulse amplitude of the predetermined pulse after a filter operation.

According to another advantageous further development, the analyzing step may be performed by using information from a look-up table. The look-up table may be updated on the basis of information read from the recording medium. The information may define a relation between said waveform and at least one of a phase error and a copy window size. The look-up table may be provided by a control program of a driver function used for generating said external magnetic field.

Strategy information defining a write strategy of the recording medium may be written on the recording medium, to be used in said analyzing step. In particular, the strategy information may be used for generating a reference waveform used in the analyzing step.

As regards the reading apparatus, the analyzing means may comprise storing means for storing information defining a relation between the waveform and at least one of a phase error and a copy window size. Furthermore, the analyzing means may comprise comparing means for comparing the analyzed waveform on the basis of the relation stored in the storing means.

The present invention will be described hereinafter on the basis of a preferred embodiment and with reference to the accompanying drawings, in which:

FIG. 1 shows a diagram of a magneto-optical disk player according to the preferred embodiment, FIG. 2A shows waveforms of a generated overlap as a function of the size of the copy window, FIG. 2B shows waveforms of an external magnetic field as a function of the synchronization phase, FIGS. 3A to 3E show waveforms of a reading signal as a function of the synchronization phase for different copy window sizes, FIG. 4 shows a look-up table indicating pulse changes in the reading signal for different phase values and copy window sizes in case of a first write strategy, and FIG. 5 shows a look-up table indicating pulse changes in the reading signal for different phase values and copy window sizes in case of a second write strategy.

A preferred embodiment will now be described on the basis of a MAMMOS disk player as indicated in FIG. 1.

FIG. 1 schematically shows the construction of the disk player according to preferred embodiments. The disk player comprises an optical pick-up unit 30 having a laser light radiating section for irradiation of a magneto-optical recording medium or record carrier 10, such as a magneto-optical disk, with light that has been converted, during recording, to pulses with a period synchronized with code data, and a magnetic field applying section comprising a magnetic head 12 which applies a magnetic field in a controlled manner at the time of recording and playback on the magneto-optical disk 10. In the optical pick-up unit 30 a laser is connected to a laser driving circuit which receives recording and read-out pulses from a recording/read-out pulse adjusting unit 32 to thereby control the pulse amplitude and timing of the laser of the optical pick-up unit 30 during a recording and read-out operation. The recording/read-out pulse adjusting circuit 32 receives a clock signal from a clock generator 26 which may comprise a PLL (Phase Locked Loop) circuit.

It is to be noted that, for reasons of simplicity, the magnetic head 12 and the optical pick-up unit 30 are shown on opposite sides of the disk 10 in FIG. 1. However, according to the preferred embodiment, they should be arranged on the same side of the disk 10.

The magnetic head 12 is connected to a head driver unit 14 and receives, at the time of recording, code-converted data via a phase adjusting circuit 18 from a modulator 24. The modulator 24 converts input recording data to a prescribed code.

At the time of playback, the head driver 14 receives a clock signal, via a playback adjusting circuit 20, from the clock generator 26, the playback adjusting circuit 20 generating a synchronization signal for adjusting the timing and amplitude of pulses applied to the magnetic head 12. A recording/playback switch 16 is provided for switching or selecting the respective signal to be applied to the head driver 14 at the time of recording and at the time of playback.

Furthermore, the optical pick-up unit 30 comprises a detector for detecting laser light reflected from the disk 10 and for generating a corresponding reading signal applied to a decoder 28 which is arranged to decode the reading signal to generate output data. Furthermore, the reading signal generated by the optical pick-up unit 30 is applied to a clock generator 26 in which a clock signal obtained from embossed clock marks of the disk 10 is extracted, and which applies the clock signal for synchronization purposes to the recording pulse adjusting circuit 32, the playback adjusting circuit 20, and the modulator 24. In particular, a data channel clock may be generated in the PLL circuit of the clock generator 26.

In the case of data recording, the laser of the optical pick-up unit 30 is modulated with a fixed frequency corresponding to the period of the data channel clock, and the data recording area or spot of the rotating disk 10 is locally heated at equal distances. Additionally, the data channel clock output by the clock generator 26 controls the modulator 24 to generate a data signal with the standard clock period. The recording data are modulated and code-converted by the modulator 24 to obtain binary run-length information corresponding to the information of the recording data.

The structure of the magneto-optical recording medium 10 may correspond to the structure described in the JP-A-2000-260079.

The occurrence of false signals due to a large overlap (e.g. laser power too high) should normally be avoided. If the correct data in the storage layer is known, the occurrence and number of false peaks gives direct information on the spatial width of the copy window which is directly related to the thermal laser profile. However, this control can be further improved if a change in the waveform of the reading signal (i.e. MAMMOS peaks) is additionally considered and analyzed. The waveform information obtained provides a direct way to correct or control the copy window size (e.g. laser power and/or field amplitude) and/or phase deviations in the synchronization between the external magnetic field and the written data.

In the preferred embodiment shown in FIG. 1, a control unit 25 is provided for applying control signals Cp and Cw to the head driver 14 or the playback adjusting circuit 20 and/or to the optical pick-up unit 30, respectively. The control signal Cp applied to the head driver 14 or, alternatively, to the playback adjusting circuit 20, can be used to adjust the timing of the pulses applied to the magnetic head, so as to adjust the timing or phase of the external magnetic field. The other control signal Cw applied to the optical pick-up unit 30 can be used for adjusting the driving current of a laser diode or another radiation source, so as to adjust the optical radiation or laser power used for heating the disk 10, and hence the size of the copy window. The two control signals Cp and Cw may be provided as alternative or combined control signals. Furthermore, a sole or combined field amplitude control can alternatively be used for copy window control.

The control unit 25 receives a comparison result from a comparing unit 22 which compares the result of an analysis of the waveform (e.g. shape of MAMMOS peaks) of the read-out signal obtained from the decoder 28 with reference data or a reference waveform stored in a non-volatile memory, e.g. a look-up table 23. The analysis is performed by an analyzing unit 21 which receives the read-out signal from the decoder 28 and is arranged to determine a change, for example, in the first pulse or peak of a run-length of the read-out signal.

When both phase errors in the synchronization and the size of the copy window are included in the analysis of the read-out waveform by the analyzing unit 21, phase errors as large as +/−180° can be detected and corrected for any value of the copy window. It is noted that both written user data as well as dedicated test areas can be used for this purpose.

Characteristic changes in the waveform of the reading signal and their relation to the copy window size and the phase error in the synchronization between the external magnetic field and the written data will be explained hereinafter with reference to signaling diagrams shown in FIGS. 2A to 3E. It is to be noted that in each of these diagrams the horizontal axis is a time axis.

Figure 1:
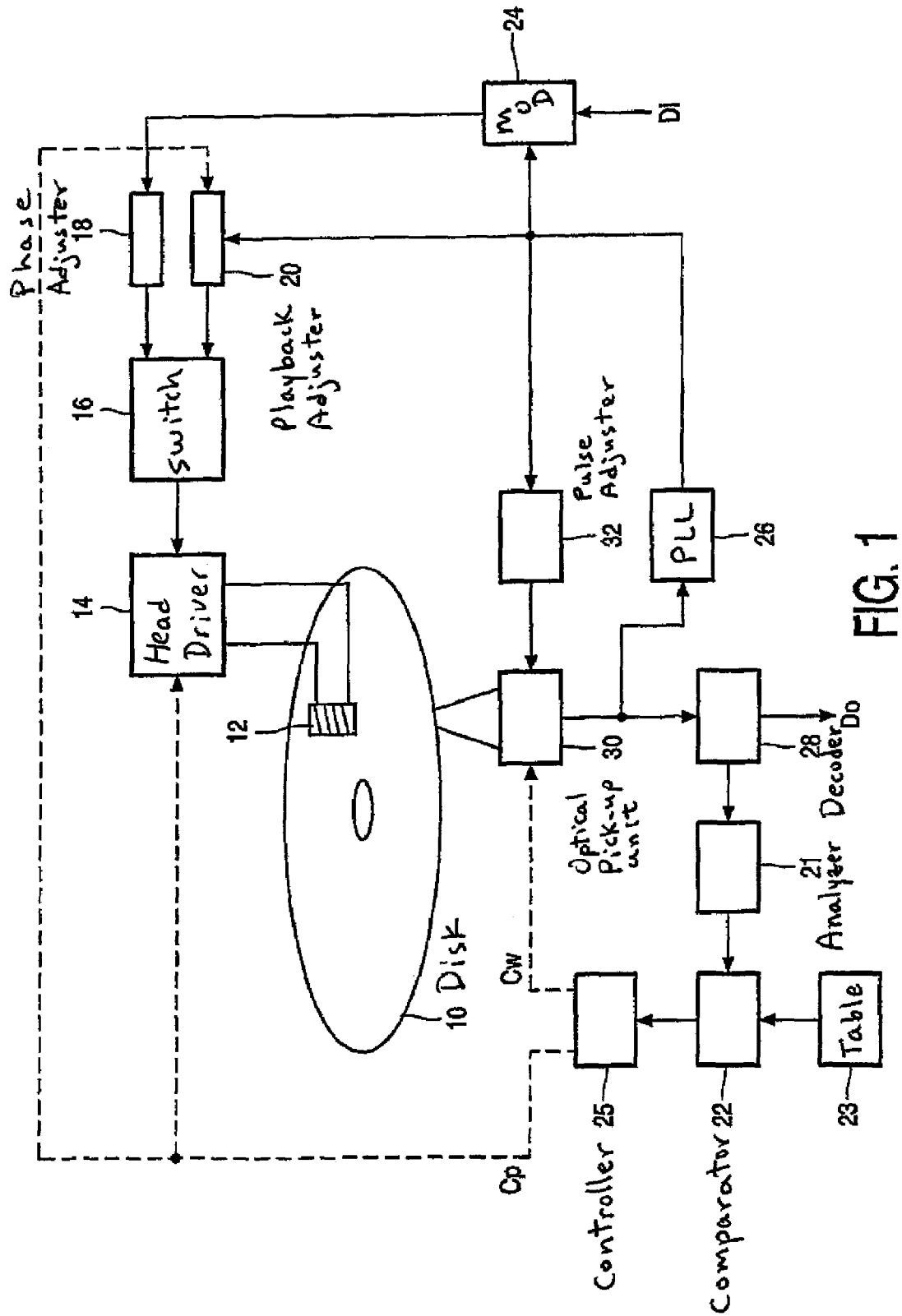
Figure 2A:
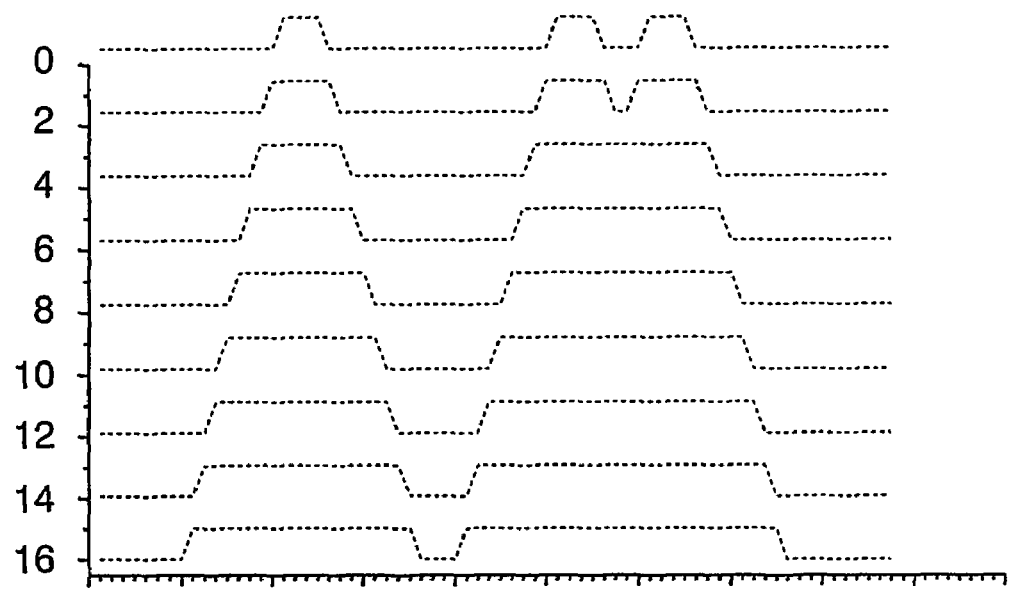
FIG. 2A shows overlap signals indicating the overlap between the copy window and a bit pattern for the case of a 50% duty cycle write strategy (i.e. mark length corresponds to 50% of the channel bit length b) for different copy window sizes (i.e. w=0 to 2 b). It is to be noted that the copy window size w=0 basically corresponds to the bit pattern on the disk 10.
Figure 2B:
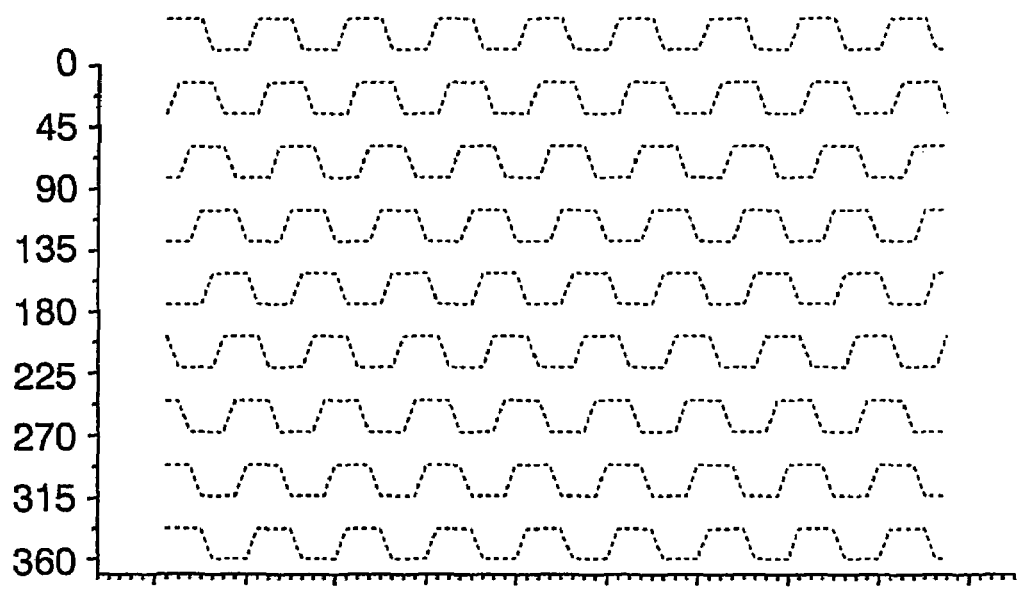
FIG. 2B shows signals indicating the modulated external field for different values of the synchronization phase, ranging from 0° to 360.

The solid lines in FIGS. 3A to 3E denote signaling diagrams indicating MAMMOS or reading signals obtained from the decoder 28 and corresponding to each combination of the window sizes w (up to a window size equal to the channel bit length b (for example w=b)) and phases, while the external field is indicated as a reference signal by the dashed lines (the dashed lines refer to the magnetic field waveforms of FIG. 2B). As can be gathered from these signaling diagrams, characteristic changes in the waveform of the reading signals can be observed. These changes can be analyzed to derive a required correction or control value for the copy window size and/or the synchronization phase of the external magnetic field. In particular, a change in the pulse width of the first pulse of a run-length in the reading signal can be used as a criterion for the phase and/or window control function. Run-lengths with more than one MAMMOS peak occur in cases of larger copy window sizes, as indicated in the FIGS. 3C to 3E. The change in the pulse width may be detected by monitoring or analyzing at least one of, for example, the timing of the leading or rising edge of the first run-length pulse. Alternatively, the duration of the first pulse of a run-length may be monitored or analyzed. The duration may be derived from a detection of the pulse amplitude at the output of a filter circuit which may be any circuit having a low-pass filter characteristic, for example, the detection or reading system of the optical pick-up unit 30.

Figure 3A:
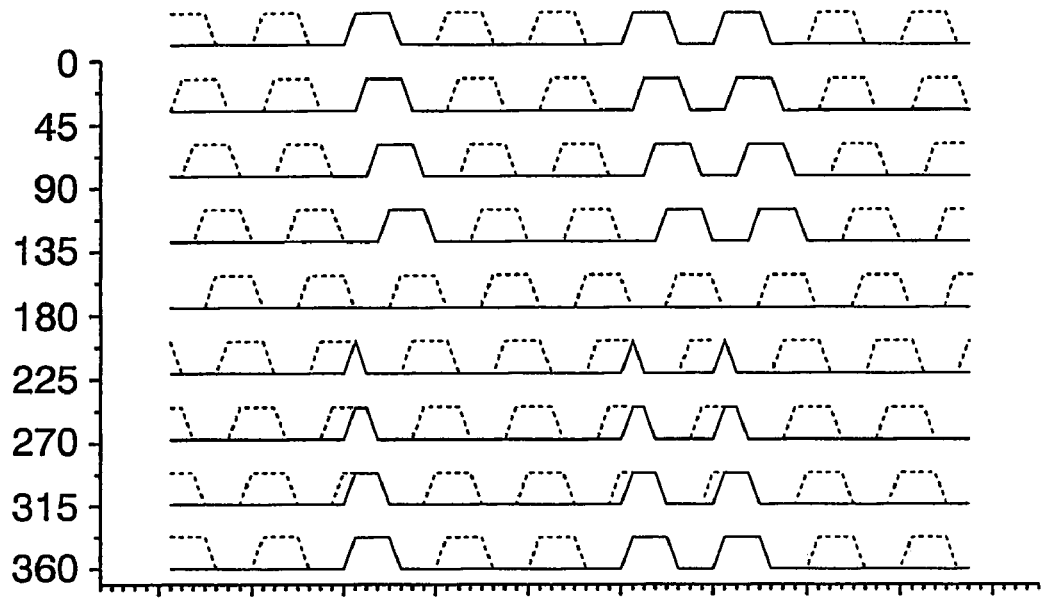
Figure 3B:
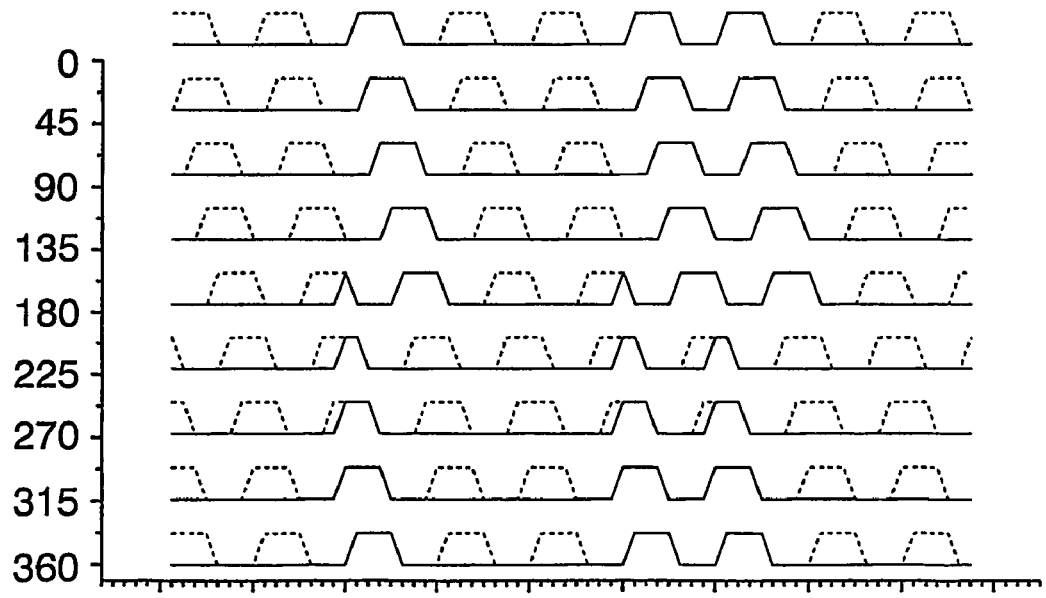
Figure 3C:
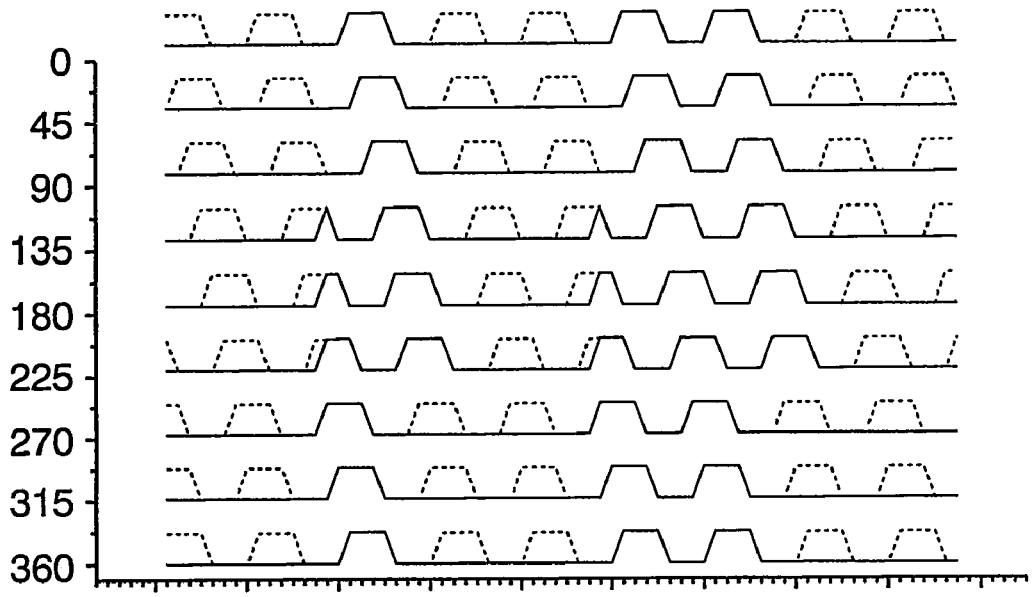
Figure 3D:
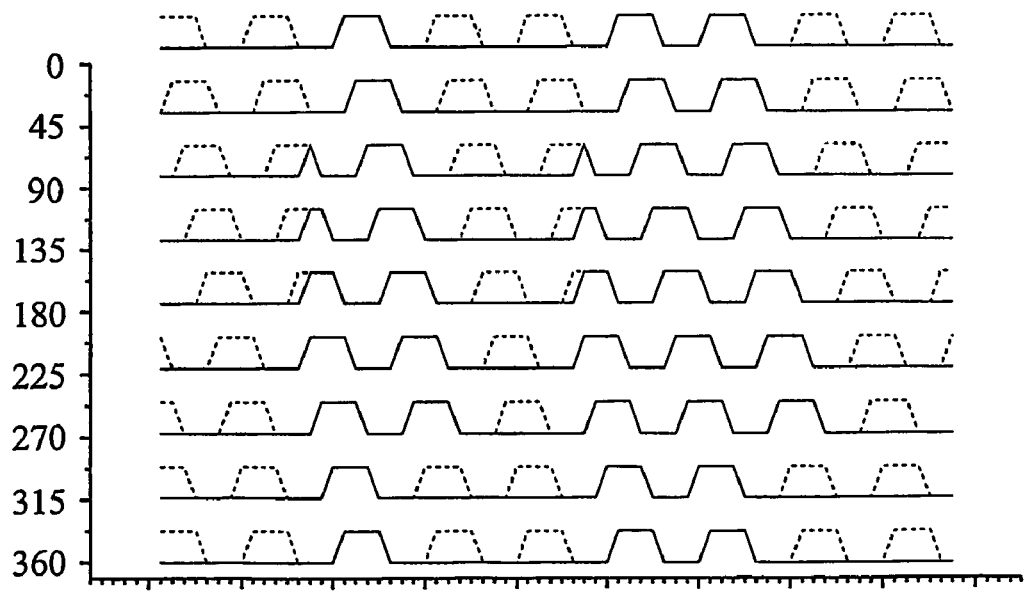
Figure 3E:
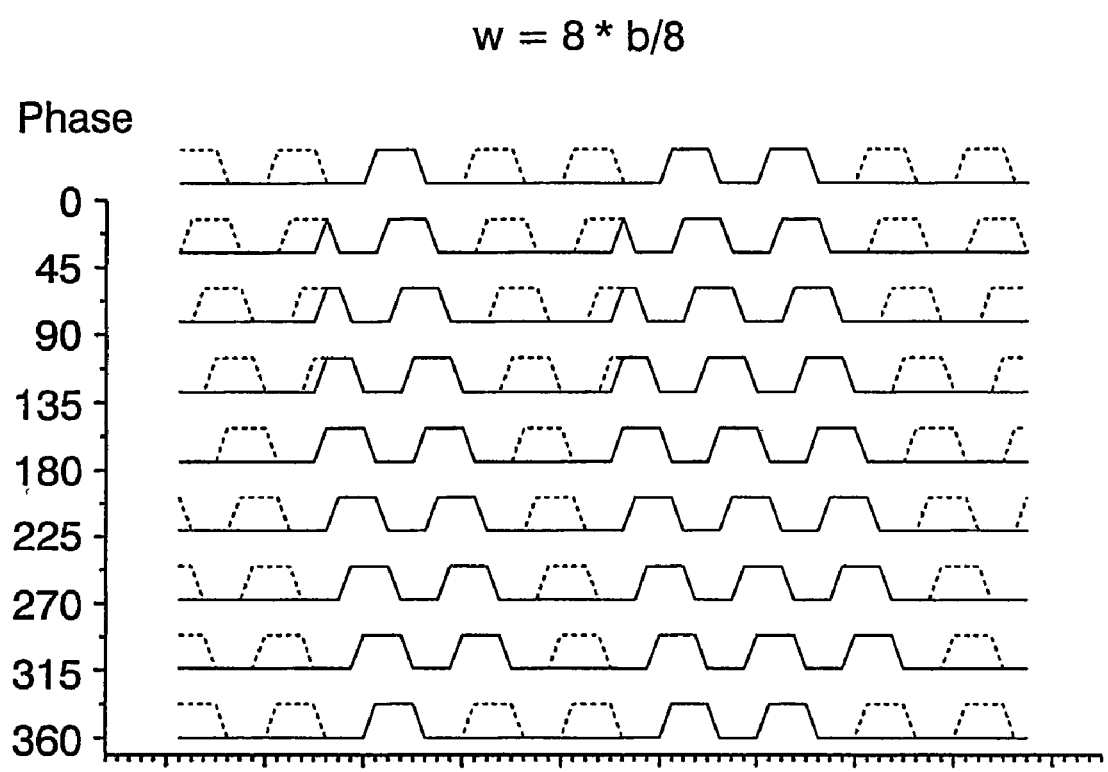

Hereinafter, the changes will be categorized as follows (using a "saturated" pulse or signal s without any change in the pulse width as a reference value):

"b=s" indicates no change in the waveform (as for example in the 0° or 315° signal of FIG. 3B);
"b<s" indicates a small change in the waveform (as for example in the 270° signal of FIG. 3B);
"b<<s" indicates a medium change in the waveform (as for example in the 225° signal of FIG. 3B); and
"b<<<s" indicates a large change in the waveform (as for example in the 180° signal of FIG. 3B).

The signals of FIGS. 3A to 3E are summarized in the table shown in FIG. 4. Each column corresponds to a different copy window size w, whereas each row corresponds to a different phase of the external magnetic field. It is clear that any deviation or change in copy window size w or phase outside the areas "b=s" (indicated by bold lines) may readily be detected by comparing e.g. the timing of the rising edges of the first MAMMOS peak of each run-length with that of the external magnetic field, and/or by comparing the length of the first peak of each run-length with the saturated reference signal (i.e. external magnetic field). Also, violations of run-length constraints due to false peaks could be included.

In particular, pulse widths shorter than the saturated signal can be detected directly with a very high bandwidth detection system or by measuring the amplitude of the signals. In the latter case, a shorter pulse will give in general a smaller signal due to limitation by the bandwidth of the detection system and/or a separate low-pass filter. In this case, the length of the peak is directly related to the signal amplitude and can thus be derived from the amplitude.

Specific run-lengths in the written data can be denoted as follows. The expression "−In" denotes a space run-length with a duration corresponding to n channel bits (minimum space or mark regions), while the expression "In" denotes a mark run-length with a duration corresponding to n channel bits. For correct read-out, in the case of a 100% write strategy, the copy window should be smaller than half the channel bit length b. In this case, each mark channel will yield one MAMMOS peak and no peaks will be generated for space channels. Thus, detection of m subsequent peaks indicates an Im mark run-length, whereas s missing peaks indicate a −Is space run-length. For larger window sizes, for example 0.5 b<w<2.5 b, MAMMOS peaks will also be generated for space regions near a mark region because of the larger overlap (dashed line in FIG. 2). For example, an I1 mark will now yield 3 peaks instead of 1. Obviously, −I1 and −I2 spaces can no longer be detected now. A −I3 space will show 1 missing peak (instead of 3). Even larger window sizes, e.g. 2.5 b<w<4.5 b, cause a difference of 4 peaks in space and mark run-length detection, while a −I5 space is the smallest space run-length that can be detected (by 1 missing peak).

Hereinafter, #+0 indicates that a run length I# yields #+0 peaks (no additional peak), while #+1 would yield #+1 peaks for the same I# (one additional peak), etc. As already mentioned, this is readily detected by monitoring violations of run-length constraints. In FIG. 4, bold lines indicate that all signals are at the saturated level (which is preferred for optimum signal detection). Furthermore, it is to be noted that the table in FIG. 4 corresponds to the waveforms shown in FIG. 3, wherein −90° corresponds to 270°.

It is to be noted also that the proposed phase and/or copy window correction or control function may also be applied to #+1 or #+2 cases (or even higher codes) as indicated in FIG. 4. These situations may correspond to an asymmetric (d=0),(d=1) or a (d=0),(d=2) code with different minimum run-lengths for mark and space regions, respectively, wherein the first value of d indicates the number of additional channel bit lengths by which the minimum mark run-length is increased and wherein the second value of d indicates the number of additional channel bit lengths by which the minimum space run-length is increased. The larger windows and larger window ranges for these codes yield significantly improved power margins.

It is also to be noted that in all cases the center of the optimum window range (b=s) in the table of FIG. 4 corresponds to a maximum robustness against phase errors (no effect for +/−90° error). Thus, the phase or copy window control function should preferably be adapted to maintain the system at such a central position.

FIG. 5 is similar to FIG. 4, but gives the results for a 100% write strategy (mark length is equal to channel bit length instead of 50% of bit length as in FIG. 4). In the table of FIG. 5, the optimum window range (b=s) in the upper left corner is considerably smaller than the corresponding region in FIG. 4 (in the middle of the left part of the table), especially for #+0 cases. Thus, a comparison of FIG. 4 and FIG. 5 demonstrates the large positive effect of a proper write strategy on the copy window margin and hence on the power margin of a laser.

A combination of simultaneous window and phase control is even better, as in that case the averaged control data from both window and phase can be used to keep the read-out conditions as close to their optimum (i.e., the center of the optimum region) as possible. Now, detection of a small phase error may directly allow a better control of the copy window and vice versa.

The different waveforms and/or pulse characteristics summarized in FIG. 4 and FIG. 5 for the two different write strategies can be stored in a look-up table, either in software or in hardware, for evaluation during read-out. However, the waveforms strongly depend on the write and read strategies that are used for recording. Therefore, a small program could preferably be implemented in, for example, the disk player (for example in one of the units 21, 22 and 25) to generate the various waveforms given the write and read strategies used. In an embodiment these write strategies may be stored in prescribed regions of the disc 10, for example in the embossed regions. The program can be called by the comparing unit 22 as a subroutine for each waveform comparison. However, it may alternatively be used to fill or update the look-up table 23, which may be faster for evaluation during read-out. Alternatively, the waveforms or pulse characteristics may be stored directly on the disk 10.

For many combinations of write and read strategies quite simple rules can be defined. For example, in the situation of the table shown in FIG. 4 the following rules may be applied, wherein "+" and "++" indicate an increase and a strong increase in phase or copy window size respectively, while "−" and "−−" indicate a decrease and a strong decrease in phase or copy window size respectively:

| first peak | deviation in number of peaks | phase correction | window correction |
| --- | --- | --- | --- |
| b = s | −1 | −− | ++ |
| b < s | +0 | + | + |
| b << s | +0 | ++ | ++ |
| b < s | +1 | −− | −− |
| b << s | +1 | − | − |
| b = s | +1 | ++ | −− |

These rules apply for symmetric or asymmetric codes with longer minimum space run-lengths, such as #+1, #+2, etc., and partially also for codes #+0 with the additional rule that no signal indicates that the window must be increased.

During MAMMOS read-out, synchronization between the bits written on the disk 10 and the external field (and the laser power in case of a pulsed strategy) is required. For this purpose timing fields provided on the disk 10 and/or a wobble in the track of the disk 10 can be used. When phase errors in the synchronization are included in the analysis of the read-out signal by the analyzing unit 21, even small changes in the copy window, compared to the channel bit length, can be detected and corrected.

The analysis of the waveform of the read-out or reading signal can be applied to written user data and/or to dedicated test areas with predefined write strategies and/or codings provided at predetermined positions of the disk 10.

The described fine-tuning method for phase and/or copy window control provides the advantage that a correction is already possible before (partially) uncorrectable errors occur. Additionally, less averaging is required so that even very small non-uniformities or brief fluctuations in field or laser power can be dealt with. In combination with an analysis of run-length violations even large jumps will no longer be a problem.

The present invention can be applied to any reading system for domain expansion magneto-optical disk storage systems. Any waveform characteristic of the read-out signal, which indicates a change in the phase or copy window size, can be used in the analysis. The functions of the analyzing unit 21, the comparing unit 22, the look-up table 23 and the control unit 25 may be provided in a single unit which may be a hardware unit or a processor unit controlled by a corresponding control program. The read-out signal may be applied directly from the optical pickup-unit 30 to the analyzing unit 21. The preferred embodiments may thus vary within the scope of the attached claims.

The invention claimed is:

1. A method of controlling read-out from a magneto-optical recording medium, said recording medium comprising a storage layer and a read-out layer, wherein an expanded domain leading to a pulse in a reading signal is generated in said read-out layer by copying a mark region from said storage layer to said read-out layer upon heating by a radiation power and with the aid of an external magnetic field, said method comprising the acts of:

providing said reading signal to a clock generator for generation of a clock signal supplied to an optical pick-up unit and a magnetic head driver;

an analysis act including providing said reading signal to an analyzer for analyzing the waveform of said reading signal and forming an analysis signal, and a controlling act including providing said analysis signal to a controller for controlling a copy window size of said mark copying based on said analysis signal by applying a first control signal to said optical pick-up unit and a second control signal to said magnetic head driver.

2. The method according to claim 1, wherein said controlling step is performed by controlling said radiation power and/or the strength of said external magnetic field.

3. The method according to claim 1, wherein synchronization phase errors between the external magnetic field, used for said mark copying, and written data are determined and used in said analyzing act.

4. A method according to claim 1, wherein said reading signal is obtained by reading a test area provided on said recording medium.

5. The method according to claim 1, wherein said reading signal is obtained by reading written user data.

6. The method according to claim 1, wherein said analyzing act comprises comparison of a timing of a rising edge of a predetermined pulse of said reading signal with a reference value.

7. The method according to claim 1, wherein said analyzing act comprises comparison of a duration of a predetermined pulse of said reading signal with a reference value.

8. The method according to claim 6, wherein said predetermined pulse is a first pulse of a code run length.

9. The method according to claim 7, wherein said duration is determined by detecting a pulse amplitude of said predetermined pulse after a filter operation.

10. The method according to claim 1, wherein said analyzing act is performed by using information from a look-up table.

11. The method according to claim 10, wherein said look-up table is updated based on information read from said recording medium.

12. The method according to claim 10, wherein said information defines a relation between said waveform and at least one of a phase error and a copy window size.

13. The method according to claim 10, wherein said look-up table is provided by a control program of a driver function used for generating said external magnetic field.

14. The method according to claim 1, further comprising the acts of:
storing on said recording medium strategy information defining a write strategy of said recording medium, and
using said strategy information in said analyzing step.

15. The method according to claim 14, wherein said strategy information is used for generating a reference waveform used in said analyzing step.

16. A reading apparatus for controlling read-out from a magneto-optical recording medium, said recording medium comprising a storage layer and a read-out layer, wherein an expanded domain leading to a pulse in a reading signal is generated in said read-out layer by copying a mark region from said storage layer to said read-out layer upon heating by a radiation power and with the aid of an external magnetic field, said apparatus comprising:
a clock generator configured to receive said reading signal and generate a clock signal which is supplied to an optical pick-up unit and a magnetic head driver;
analyzing means for analyzing the waveform of said reading signal and forming an analysis signal; and
control means for controlling a copy window size of said mark copying based on said analysis signal by applying a first control signal to said optical pick-up unit and a second control signal to said magnetic head driver.

17. The reading apparatus according to claim 16, wherein said analyzing means comprises storing means for storing information defining a relation between said waveform and at least one of a phase error and a copy window size.

18. The reading apparatus according to claim 17, wherein said analyzing means comprises comparing means for comparing said analyzed waveform based on said relation stored in said storing means.

19. The reading apparatus according to claim 16, wherein said reading apparatus is a disk player for MAMMOS disks.

* * * * *